(12) United States Patent
Pluta et al.

(10) Patent No.: US 9,914,374 B2
(45) Date of Patent: Mar. 13, 2018

(54) EASY-ENTRY SYSTEM AND VEHICLE SEAT WITH AN INTEGRATED EASY-ENTRY SYSTEM

(71) Applicant: Johnson Controls Technology Company, Plymouth, MI (US)

(72) Inventors: Wolfgang Pluta, Heiligenmoschel (DE); Christian Wolf, Katzenbach (DE); Thomas Dill, Heiligenmoschel (DE); Heinrich Hammann, Teschenmoschel (DE)

(73) Assignee: Johnson Controls Technology Company, Plymouth, MI (US)

( * ) Notice: Subject to any disclaimer, the term of this patent is extended or adjusted under 35 U.S.C. 154(b) by 24 days.

(21) Appl. No.: 15/028,815

(22) PCT Filed: Oct. 7, 2014

(86) PCT No.: PCT/EP2014/071445
§ 371 (c)(1),
(2) Date: Apr. 12, 2016

(87) PCT Pub. No.: WO2015/055467
PCT Pub. Date: Apr. 23, 2015

(65) Prior Publication Data
US 2016/0257224 A1    Sep. 8, 2016

(30) Foreign Application Priority Data

Oct. 16, 2013 (DE) .......................... 10 2013 220 958
Dec. 12, 2013 (DE) .......................... 10 2013 225 698

(51) Int. Cl.
*B60N 2/02* (2006.01)
*B60N 2/14* (2006.01)
(Continued)

(52) U.S. Cl.
CPC .................. *B60N 2/14* (2013.01); *B60N 2/12* (2013.01); *B60N 2/2356* (2013.01)

(58) Field of Classification Search
CPC ........... B60N 2/14; B60N 2/12; B60N 2/2356
(Continued)

(56) References Cited

U.S. PATENT DOCUMENTS 7,152,924 B1 * 12/2006 Nemoto ................... B60N 2/20
                                                                    297/378.12
7,255,398 B2 *  8/2007 Tokui ....................... B60N 2/20
                                                                    297/354.12
(Continued)

FOREIGN PATENT DOCUMENTS

CN      102 036 850 A      4/2011
DE      195 28 683 A1      2/1997
(Continued)

OTHER PUBLICATIONS

Chinese Office Action dated Feb. 15, 2017, along with a machine generated translation.

*Primary Examiner* — Jose V Chen
(74) *Attorney, Agent, or Firm* — McGlew and Tuttle, P.C.

(57) ABSTRACT

An easy-entry system (EE) for a vehicle seat (1) with a backrest (1.1) and a seat cushion (1.2), in arrangement with a fitting (2) for adjusting the inclination of the backrest (1.1) relative to the seat cushion (1.2) at least within a comfort range and optionally with an extended comfort function for positioning the backrest (1.1) beyond an easy-entry position into a loading floor position. The system includes, for initiating an easy-entry function, at least one actuating lever (4) which is coupled via at least one tension element (6) to an unlocking lever (8) for unlocking the inclination adjustment of the backrest (1.1). A translatory movement of the tension element (6) is transformed by means of a sliding
(Continued)

element (7.2) of a transmission arrangement (7) into a rotatory movement of the unlocking lever (8) for opening the fitting (2).

20 Claims, 14 Drawing Sheets

(51) Int. Cl.
  *B60N 2/12* (2006.01)
  *B60N 2/235* (2006.01)
(58) Field of Classification Search
  USPC .................................. 297/366, 378.12, 367 R
  See application file for complete search history.

(56) References Cited

U.S. PATENT DOCUMENTS

| | | | | |
|---|---|---|---|---|
| 7,575,281 B2* | 8/2009 | Jeong | ................... | B60N 2/2354 |
| | | | | 297/341 |
| 7,578,556 B2* | 8/2009 | Ohba | ...................... | B60N 2/20 |
| | | | | 297/354.12 |
| 8,439,443 B2* | 5/2013 | Nakane | ............... | B60N 2/3013 |
| | | | | 297/341 |
| 8,459,731 B2* | 6/2013 | Runde | ................. | B60N 2/4855 |
| | | | | 297/378.12 |
| 2001/0028189 A1* | 10/2001 | Klein | ...................... | B60N 2/20 |
| | | | | 297/378.12 |
| 2003/0052523 A1* | 3/2003 | Becker | ................... | B60N 2/20 |
| | | | | 297/378.12 |
| 2004/0239169 A1* | 12/2004 | De Nichilo | ............. | B60N 2/22 |
| | | | | 297/378.12 |
| 2004/0256900 A1 | 12/2004 | Kammerer | | |
| 2005/0062329 A1* | 3/2005 | Alacqua | ................... | B60N 2/20 |
| | | | | 297/378.12 |
| 2006/0250013 A1 | 11/2006 | Shao | | |
| 2008/0169695 A1* | 7/2008 | Hahn | ...................... | B60N 2/12 |
| | | | | 297/367 R |
| 2011/0215627 A1* | 9/2011 | Wieclawski | .......... | B60N 2/366 |
| | | | | 297/378.12 |
| 2011/0260518 A1* | 10/2011 | Scheurer, II | ......... | B60N 2/3013 |
| | | | | 297/378.12 |
| 2012/0062012 A1* | 3/2012 | Miller | ...................... | B60N 2/20 |
| | | | | 297/378.12 |
| 2013/0043708 A1* | 2/2013 | Gupte | ...................... | B60N 2/20 |
| | | | | 297/378.12 |
| 2015/0329014 A1* | 11/2015 | Elton | .................... | B60N 2/2352 |
| | | | | 297/378.12 |
| 2016/0016493 A1* | 1/2016 | Deppe | ................. | B60N 2/0232 |
| | | | | 297/378.12 |
| 2017/0136921 A1* | 5/2017 | Dill | ........................ | B60N 2/12 |

FOREIGN PATENT DOCUMENTS

| | | |
|---|---|---|
| DE | 10 2004 008 599 B3 | 6/2005 |
| DE | 10 2005 003 817 A1 | 8/2006 |
| DE | 10 2006 015 138 A1 | 10/2007 |
| EP | 1 291 236 A2 | 3/2003 |
| WO | 99/38723 A1 | 8/1999 |

\* cited by examiner

EASY-ENTRY SYSTEM AND VEHICLE SEAT WITH AN INTEGRATED EASY-ENTRY SYSTEM

CROSS REFERENCE TO RELATED APPLICATIONS

This application is a United States National Phase Application of International Application PCT/EP2014/071445 filed Oct. 7, 2014 and claims the benefit of priority under 35 U.S.C. § 119 of German Patent Applications 10 2013 220 958.4 filed Oct. 16, 2013 and 10 2013 225 698.1 filed Dec. 12, 2013 the entire contents of which are incorporated herein by reference.

FIELD OF THE INVENTION

The invention relates to an easy-entry system for a vehicle seat, in particular a vehicle seat having a fitting with easy-entry function, and to a vehicle seat having an integrated easy-entry system of said type.

BACKGROUND OF THE INVENTION

In the prior art, various easy-entry systems are known which permit easier boarding into a second row of seats of a vehicle. The easy-entry system is actuable by way of an unlocking lever, which is normally arranged on a backrest of the vehicle seat, whereby the backrest of the vehicle seat pivots out of a boarding region. If the vehicle seat is arranged on rails, it is possible, when the unlocking lever is actuated, for the vehicle seat to additionally or alternatively be displaceable out of the boarding region in the direction of travel.

DE 10 2005 003 817 A1 describes a motor vehicle seat having a seat part and having a backrest which is lockable by way of an unlocking mechanism in an inclination detent adjustment mechanism, said backrest being pivotable about a pivot axis, which is fixed relative to the seat part, by way of an easy-entry operating lever into an easy-entry position, and by way of a comfort/cargo operating lever, which is fixed relative to the seat part, into a comfort or cargo position, and having an unlocking lever, said unlocking lever being actuable by the easy-entry operating lever and the comfort/cargo operating lever and being mounted so as to be pivotable about the pivot axis being fixed relative to the seat part and being operatively connected by way of an unlocking shaft, which runs coaxially with respect to the pivot axis, to an adjustable locking element of the inclination detent adjustment mechanism, which locking element is engageable with detent action with a locking element, which is fixed relative to the seat part, of the inclination detent adjustment mechanism, wherein the unlocking lever is operatively connected to a pivoting hoop which is actuable by way of the easy-entry operating lever and which is preloaded into a locking position of the inclination detent adjustment mechanism and which is mounted so as to be rotatable about a pivoting hoop axis which is fixed relative to the backrest.

DE 10 2006 015 138 A1 has disclosed a motor vehicle seat having a seat part and having a backrest which is adjustable in terms of inclination and which is pivotable, about a pivot spindle fixed relative to the seat part, from a usage position into a forwardly inclined or folded-forward position and which is connected lockably and unlockably to the seat part by way of a detent adjustment fitting arranged on the pivot spindle, wherein the detent adjustment fitting is lockable and unlockable by way of a loading cable coupled thereto, which Bowden cable is actuable by way of a Bowden cable lever, wherein the Bowden cable lever of the Bowden cable is arranged above the backrest pivot spindle on the backrest frame, and wherein the Bowden cable core is guided around a first diverting roller, mounted in floating fashion on the pivot spindle, and about a second diverting roller, which is arranged within the backrest frame so as to be fixed relative to the seat part, and said Bowden cable core is fastened, by way of its end averted from the Bowden cable lever, to the free end of a detent adjustment fitting unlocking lever, the other end of which is connected rotationally conjointly to the pivot spindle.

SUMMARY OF THE INVENTION

It is an object of the present invention to specify an improved easy-entry system and a vehicle seat having an integrated easy-entry system of said type with an enhanced comfort function.

The object is achieved according to the invention by way of a vehicle seat having a fitting with an integrated easy-entry system and possibly with an enhanced comfort function for the positioning of the backrest beyond an easy-entry position into a loading floor position, wherein the easy-entry system has, for triggering the easy-entry function, at least one actuation lever which is connected via at least one tension element to an unlocking lever, wherein the tension element is articulatedly connected in the region of a pivot axis of the backrest such that the tension element is not tensioned when the backrest is folded down. The slide element has at least one receiving element with an externally at least partially encircling groove in which an end-side loop of the tension element is arranged. This constitutes a particularly simple form of suspension of the tension element. For this purpose, the receiving element is in particular in the form of a disk or a circular ring. Furthermore, a loop-disk connection of said type permits simple assembly.

The invention is based on the concept that the tension element, for example a Bowden cable, is not subjected to tension when the backrest is folded down. For this purpose, the tension element, in the pulled state, finds a lower center of rotation which is close to the backrest center of rotation or the pivot axis of the backrest. If the backrest is folded down, no change in length between eyelet and upper suspension or articulation point occurs.

Tensioning, or the formation of slack, in the normal comfort range is in this case accepted, because this is relatively slight (approximately 20° of a backrest adjustment in the comfort range in relation to 100° in the case of a backrest adjustment into the loading floor position).

In particular, the fitting of the vehicle seat is composed of a fitting upper part, which is arranged on the backrest, and a fitting lower part, which is fastened to a substructure, wherein a fitting of said type may be arranged at at least one side of the vehicle seat. Here, the transmission arrangement comprises at least one main element, which is fixed relative to the substructure, and a slide element, which is movable relative to said main element, in particular in translational fashion, and which has a driver which engages into a recess of the unlocking lever.

Furthermore, an easy-entry system for a vehicle seat having a backrest and having a seat cushion, in an arrangement with a fitting for the inclination adjustment of the backrest relative to the seat cushion at least in a comfort range and possibly with an enhanced comfort function for the positioning of the backrest beyond an easy-entry position into a loading floor position, is provided, wherein the easy-entry system comprises, for triggering an easy-entry function, at least one actuation lever which is coupled via at least one tension element to an unlocking lever for the unlocking of the inclination adjustment of the backrest, wherein the tension element is articulatedly connected in the region of a pivot axis of the backrest such that the tension element is not tensioned when the backrest is folded down.

In a possible embodiment, a translational movement of the tension element is transformed by way of a transmission arrangement into a rotational movement of the unlocking lever for the opening of the fitting. The invention permits an improved profile, and in particular improved suspension, of the tension element or tension member. Furthermore, the assembly of the easy-entry system is considerably improved, and the unlocking movement facilitated.

In a possible embodiment, the transmission arrangement comprises at least one main element, which is fixed relative to a substructure, and a slide element, which is movable relative to said main element, in particular in translational fashion, and which has a driver which engages into the unlocking lever, in particular into a recess of the unlocking lever, and drives the unlocking lever along. By pulling on the tension element, the slide element, and with that the driver, are moved in particular in translational fashion, whereby the driver, which engages on the unlocking lever, positively drives said unlocking lever along, such that said unlocking lever pivots up and the fitting is opened.

A further embodiment provides that the slide element has at least one recess in which a bearing element of the main element is arranged, wherein the bearing element and the recess form a slot-pin guide or a sliding-block guide. Here, the bearing element is in particular in the form of a bearing bushing which substantially surrounds a transmission element such as a transmission rod. Furthermore, the transmission element may be arranged between the side parts of the backrest in an elongate tube or in a casing element.

For assistance and transmission of the pulling movement of the tension element, the slide element is held on the main element so as to be movable, in particular longitudinally movable, relative thereto. In a possible embodiment, the slide element has at least one protruding peg which engages into a channel of the main element, wherein the peg and the channel form a channel-peg guide or sliding-block guide. Alternatively, the slide element may be equipped with a channel into which a peg which protrudes from the main element engages in translational, in particular longitudinally movable fashion. A further embodiment provides two channels on the main element and two corresponding pegs on the slide element. An alternative embodiment provides for the slide element to have a further center of rotation, wherein the slide element is for example guided not in a straight sliding-block guide track but in a curved or arcuate sliding-block guide track (for example an arcuate elongated hole) in the main element.

In a further embodiment, the driver is in the form of a driving pin which projects from the slide element and which engages into a recess of the unlocking lever. Here, the unlocking lever is held, rotatably relative to the slide element, in positively locking and/or non-positively locking fashion on a transmission element, and so as to be rotationally conjoint with respect to the latter. When the actuation lever is pulled and thus the slide element is displaced, the unlocking lever is actuated, in particular rotated, whereby the transmission element rotates and the fitting is opened. Here, the transmission element is rotatably mounted in a bearing means of the main element.

The transmission element is in particular a rod or a tube which connects the fitting component to a further fitting component that may be provided or to a rotary bearing, wherein the transmission element is rotatable about its longitudinal axis, such as is known from DE 10 2004 008 599 B3. If two fitting components are provided, these are coupled to the transmission element, wherein said coupling results preferably from a positively locking connection between a respective end of the transmission element and the respective fitting component. Furthermore, an axial securing means may be provided which is for example a so-called quick-action fastener and which, during the assembly process and during transportation of the detent fitting, prevents a displacement of the fitting parts in an axial direction, wherein a rotation of the fitting upper parts relative to the fitting lower parts is possible.

For the positively locking and/or non-positively locking coupling of the unlocking lever to the transmission element, the unlocking lever has an in particular circular inner contour or inner profile, which corresponds to the outer contour of the transmission element.

The invention also relates to a vehicle seat having an integrated easy-entry system of said type with simple cable suspension and guidance of the tension element for the unlocking of the fitting.

Exemplary embodiments of the invention will be discussed in more detail below on the basis of exemplary embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Parts which correspond to one another are denoted by the same reference designations throughout the Figures.

Figure 1:
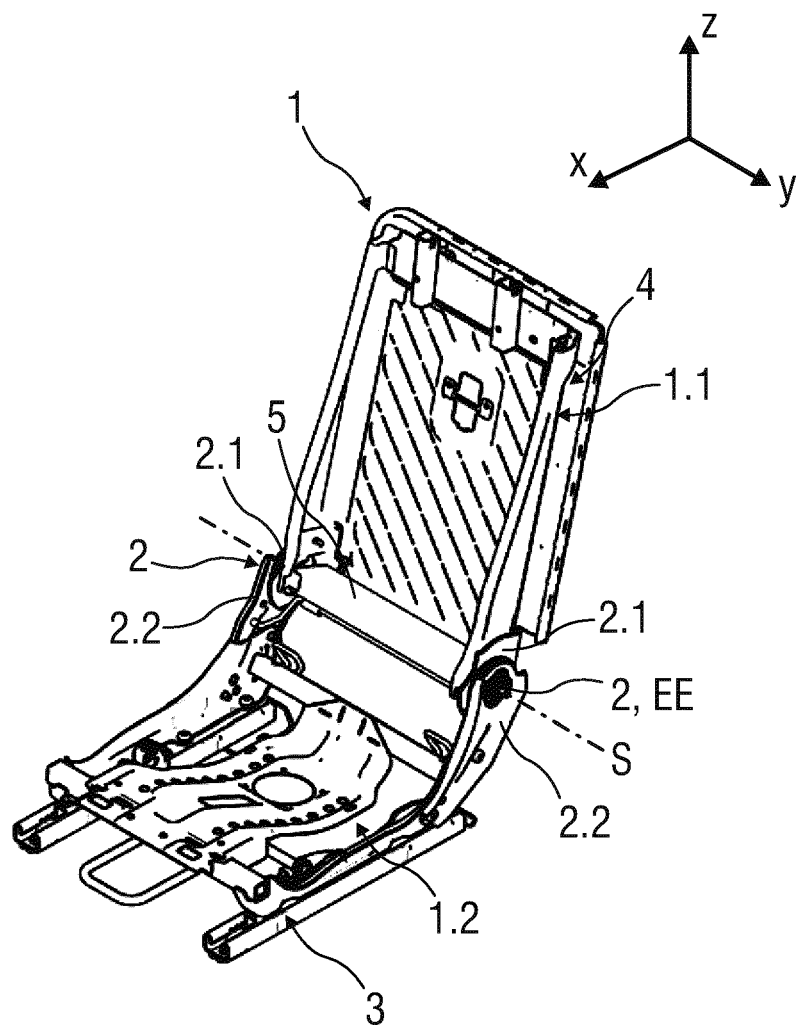
FIG. 1 is a schematic perspective view showing a vehicle seat having a backrest and having a seat cushion and having a fitting with integrated easy-entry system and a possibly enhanced comfort function.

FIG. 1 schematically shows, in a perspective view from the front, a vehicle seat 1 having a backrest 1.1 and having a seat cushion 1.2 and having at least one fitting 2, wherein the backrest 1.1 is arranged rotatably on the seat cushion 1.2 by way of the fitting 2. In the exemplary embodiment as per FIG. 1, the vehicle seat 1 has two fittings 2. Alternatively, in a manner not illustrated in any more detail, the vehicle seat 1 may have one fitting and an oppositely situated rotary bearing.

The arrangement of the vehicle seat 1 in the vehicle defines the coordinate system used below, comprising a vertical axis z, a longitudinal axis x and a transverse axis y, wherein the vertical axis z is parallel to the vehicle vertical orientation, the longitudinal axis x is parallel to the vehicle longitudinal orientation, and the transverse axis y is parallel to the vehicle transverse orientation.

The vehicle seat 1 is for example a front seat or is a vehicle seat of a rear, for example second row of seats for a vehicle, and is arranged on a rail system 3, whereby the vehicle seat 1 is displaceable in the longitudinal direction of the vehicle.

To facilitate boarding into a rear-seat region or to a rear row of seats of the vehicle, the vehicle seat 1 has an easy-entry function realizable by way of an easy-entry system EE of the fitting 2.

The easy-entry function is a boarding aid which makes it possible to realize enlarged and thus more comfortable access to the rear-seat region, in particular of a two-door vehicle, or to a rear row of seats of a multi-door vehicle. By means of the easy-entry system EE, the vehicle seat 1 is displaced on the rail system 3 in the direction of travel in order to enlarge the boarding region, wherein at the same time, the backrest 1.1 of the vehicle seat 1 is pivoted forward. Here, a pivoting range of the backrest 1.1 when the easy-entry function is triggered is limited, for example is limited to 35° forward into an easy-entry position.

Furthermore, the backrest 1.1 is pivotable into a further comfort position, in particular into a loading floor position, by way of an enhanced comfort function. In said loading floor position or table position, the backrest 1.1 is arrangeable substantially parallel to the seat cushion 1.2.

The backrest 1.1 is pivotable about a pivot axis S which runs in the direction of transverse extent of the vehicle. The pivoting of the backrest 1.1 is triggerable by actuation of an actuation lever 4. The actuation lever 4 is provided only on one side of the vehicle seat 1.

On each side of the vehicle seat 1 there is arranged a fitting 2 which is formed from a fitting upper part 2.1 and from a fitting lower part 2.2. The fitting upper part 2.1 is fastened fixedly to the backrest 1.1, and the fitting lower part 2.2 is fastened so as to be fixed relative to a substructure, for example to the vehicle floor. The fitting 2 is designed such that a relative rotational movement takes place between the fitting upper part 2.1 and the fitting lower part 2.2.

The fittings 2 arranged on each side of the backrest 1.1 are coupled to one another by way of a transmission element 5 in the form of a cranked transmission rod or a tube, such that locking of the backrest 1.1 can be eliminated on both sides in order to allow the latter to be pivoted. Here, in each case one fitting 2 is fastened in positively locking fashion to one end of the transmission element 5.

The transmission element 5 is in particular a rod or a tube which connects the fitting component to a further fitting component that may be provided, wherein the transmission element 5 is rotatable about its longitudinal axis, as is known from DE 10 2004 008 599 B3.

The easy-entry system EE is integrated in the fitting 2 and is thus formed as an integrated structural unit with the latter. Alternatively, the easy-entry system EE may be in the form of an integrated module and be arranged, as shown in FIGS. 2 and 3, on the fitting 2.

Figure 2:
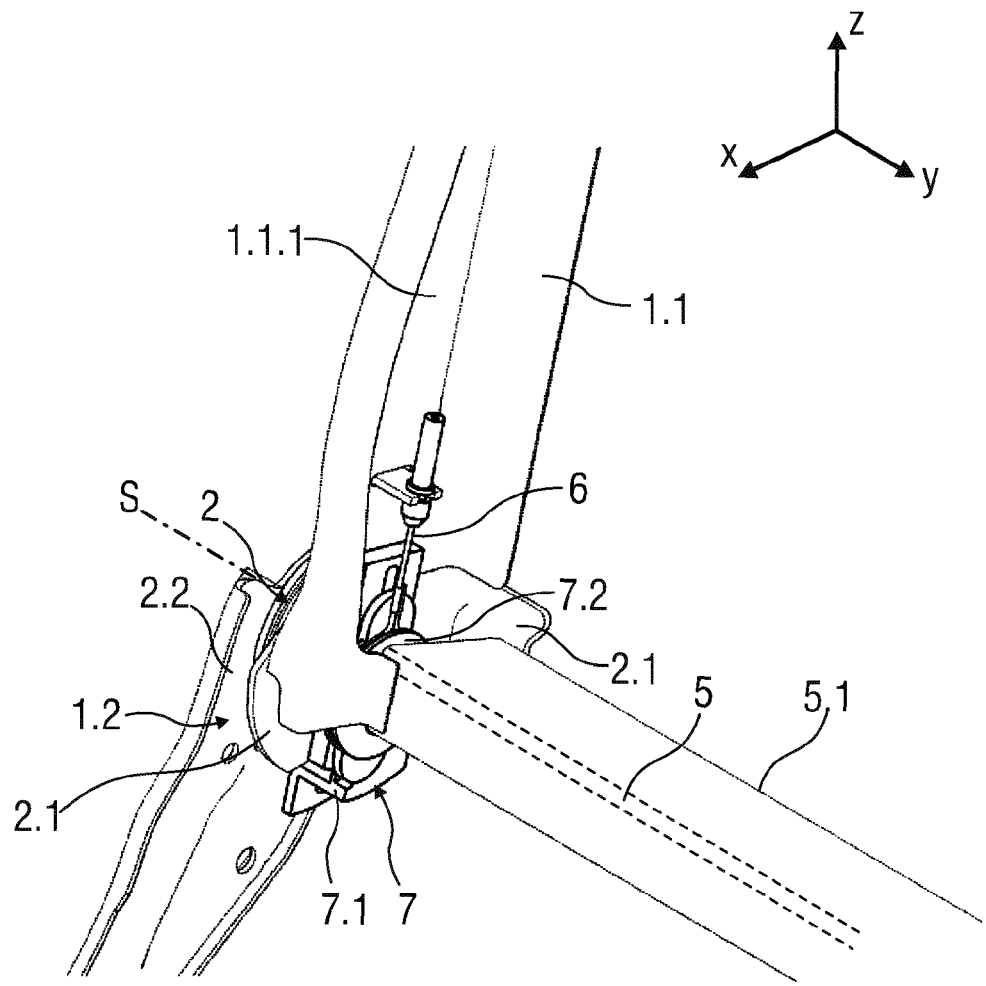
FIG. 2 is a schematic perspective view showing some of various components of the fitting.
Figure 3:
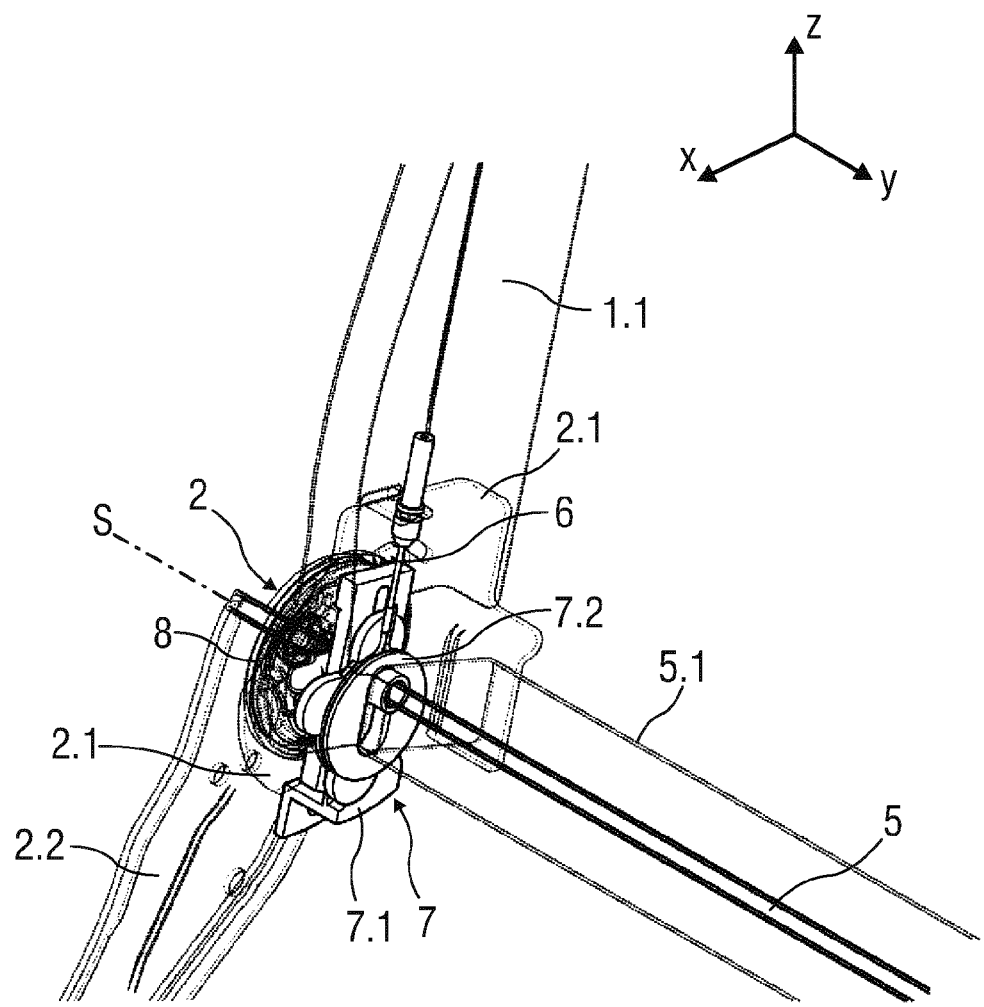
FIG. 3 is a schematic perspective view showing some of various components of the fitting.

FIG. 2 shows, in detail in an enlarged perspective illustration, the vehicle seat 1 in the region of the fitting 2.

The actuation lever 4 for the triggering of the easy-entry function is coupled by way of a tension element 6 to a transmission arrangement 7 which is arranged, so as to be fixed relative to a substructure, on the vehicle seat 1, in particular on the fitting lower part 2.2.

The transmission arrangement 7 comprises a main element 7.1 and a slide element 7.2, on which the tension element 6 is mounted, in particular suspended. The tension element 6 is in the form of a Bowden cable or some other suitable transmission means for transmitting control movements.

The transmission arrangement 7 is in this case, as shown by way of example in FIG. 2, arranged at the inner side on a side part 1.1.1 of the backrest 1.1, and thus indirectly on the inner-side part of the fitting upper part 2.1 in the direction of the transmission element 5. The transmission element 5 is surrounded by a casing element 5.1, in particular a tube.

The side part 1.1.1 of the backrest 1.1 is in the form of a U-shaped profile, wherein the transmission arrangement 7 is arranged between the limbs of the side part 1.1.1 and is thus held so as to be adequately protected.

FIG. 3 shows, in a perspective view obliquely from the front, the vehicle seat 1 in semi-transparent form in the region of the fitting 2, wherein the components for the unlocking of the fitting 2, in particular the transmission arrangement 7 and an unlocking lever 8 of the easy-entry system EE, are illustrated by way of solid lines, and the other components, such as fitting upper and lower part 2.1, 2.2, the side part 1.1.1 of the backrest 1.1, the casing element 5.1, the fitting 2 and the tension element 6, are illustrated by way of dotted lines.

Figure 4:
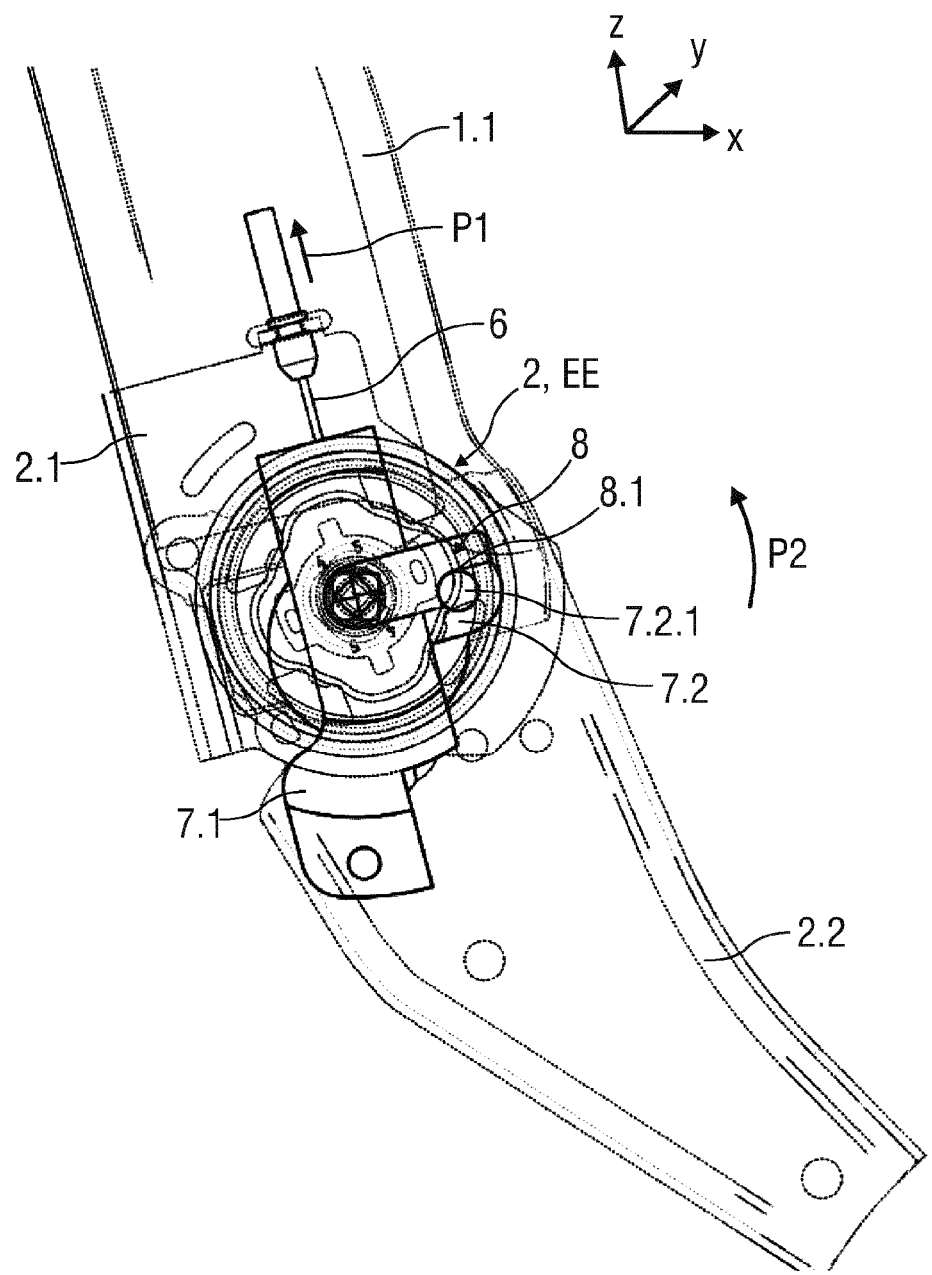
FIG. 4 is a side perspective view showing some of various components of the fitting.
Figure 5:
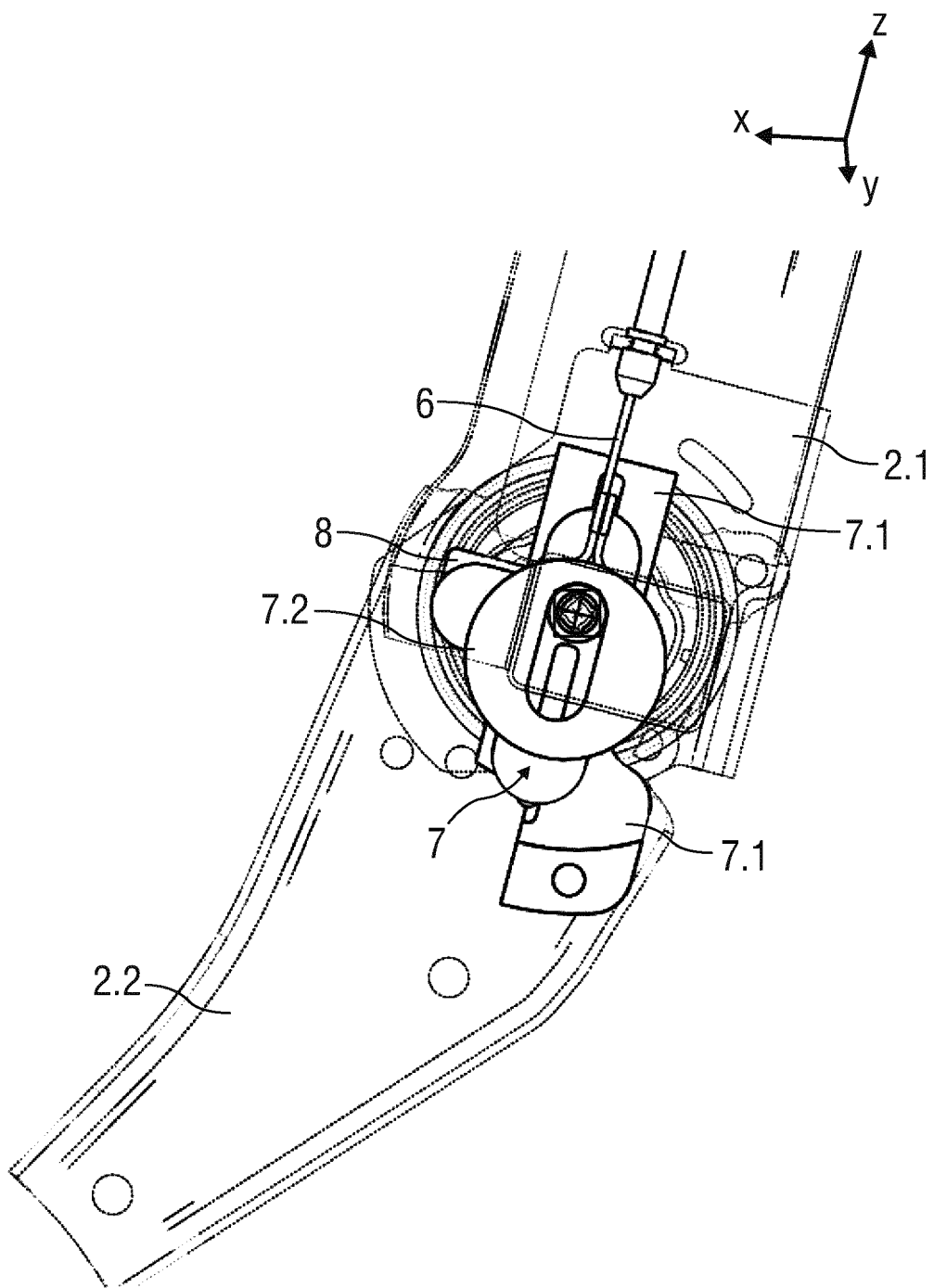
FIG. 5 is a schematic side view showing some of various components of the fitting.

FIGS. 4 and 5 show the fitting 2 with integrated easy-entry system EE and transmission arrangement 7 in semi-transparent form in a side view from the outside and from the inside respectively. The slide element 7.2 comprises a driver 7.2.1 which engages into a recess 8.1 of the rotatably mounted unlocking lever 8 of the easy-entry system EE.

By actuating the (easy-entry) actuation lever 4 and pulling the tension element 6 in the direction of the first arrow P1, the driver 7.2.1 is pivoted counterclockwise about the pivot axis S in the direction of a second arrow P2 in order to unlock the fitting 2 and trigger an adjustment function and/or the easy-entry function, whereby the fitting 2 is unlocked and the backrest 1.1 is pivotable forward clockwise from a seat position via at least one intermediate position into an easy-entry position or into some other forward position, in particular a boarding or loading position, and the vehicle seat 1 is possibly displaceable. The intermediate position(s) of the backrest 1.1 may in this case represent a comfort seat range of the backrest 1.1, which intermediate position(s) can be set by way of a seat function integrated in the fitting 2.

By means of the easy-entry function of the fitting 2, and when the fitting 2 is unlocked (not locked), the backrest 1.1 may be pivotable, possibly clockwise, further forward, via the easy-entry position or the other forward position for an enhanced comfort function, into a loading floor position.

Figure 6:
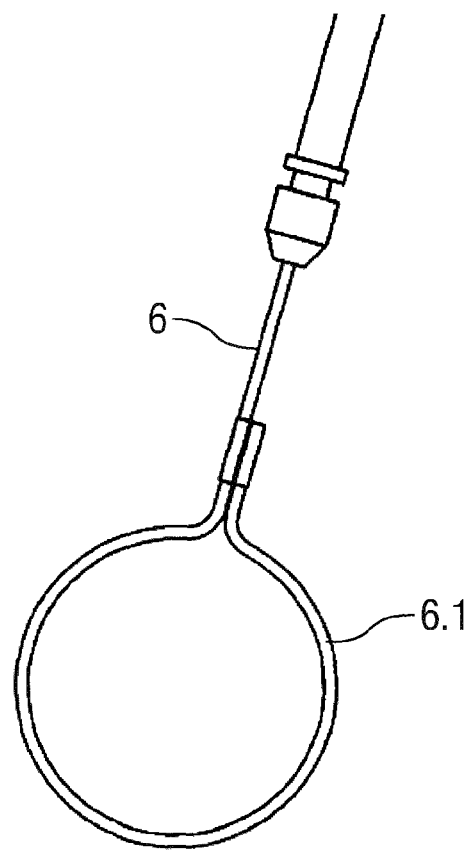
FIG. 6 is a schematic side view showing a component of the fitting.

FIG. 6 shows the tension element 6 in the form of a Bowden cable in detail. Here, the tension element 6 has, in the region of the end mounted on the slide element 7.2 close to the center of rotation in the region of the pivot axis S of the backrest 1.1, at least one loop 6.1 or winding. Alternatively, the end of the tension element 6 may be equipped with a ring element.

Figure 7:
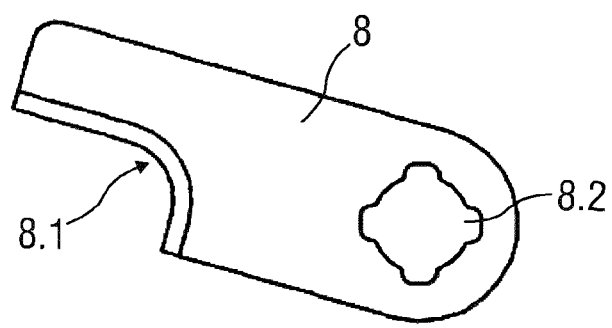
FIG. 7 is a schematic side view showing a component of the fitting.

FIG. 7 shows the unlocking lever 8 in detail. For the engagement of the driver 7.2.1 on the unlocking lever 8, said unlocking lever has a recess 8.1. Furthermore, the unlocking lever 8 is coupled in positively locking and/or non-positively locking fashion to the transmission element 5 by way of a receptacle 8.2. For this purpose, the receptacle 8.2 has an inner contour or an inner profile which corresponds to the outer contour or to the outer profile of the transmission element 5 or of the casing element 5.1.

Figure 8:
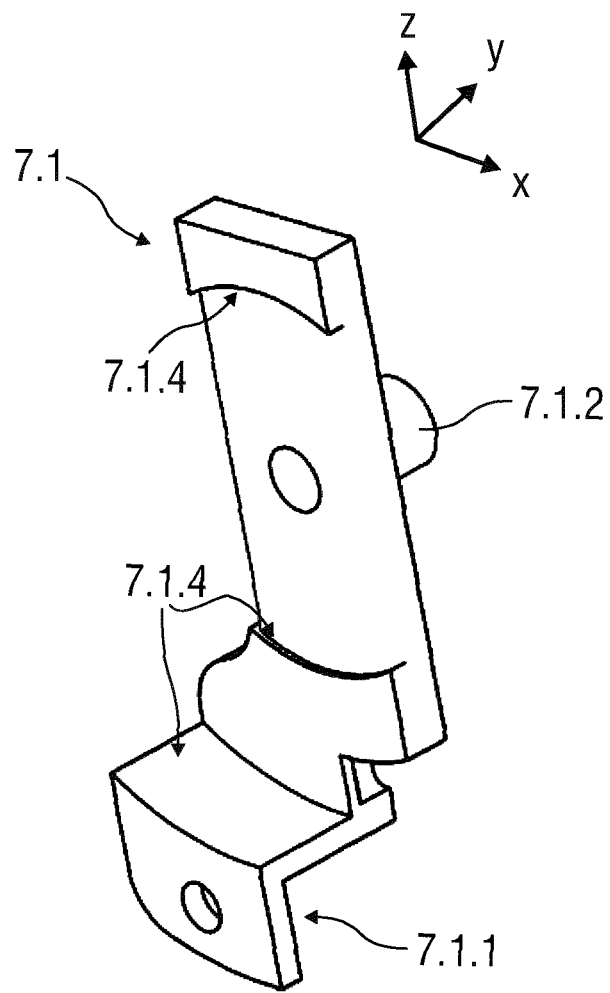
FIG. 8 is a schematic perspective view showing a component of the fitting.

FIG. 8 shows the main element 7.1, in the form of a carrier, of the transmission arrangement 7 in a perspective plan view of one of the surface sides. The main element 7.1 has an end 7.1.1 which is fixed relative to a substructure and which is designed such that it can be fastened to the lower fitting part 2.2. Furthermore, the main element has a bearing means 7.1.2 for the rotatable arrangement of the transmission element 5. The bearing means 7.1.2 is formed in the manner of a bearing bushing which protrudes from the main element 7.1.

On that side of the main element 7.1 which is situated opposite the bearing bushing, said main element has shoulders 7.1.4 in which a component of the fitting 2 and/or a segment of the fitting upper part 2.1 can be received.

Figure 9:
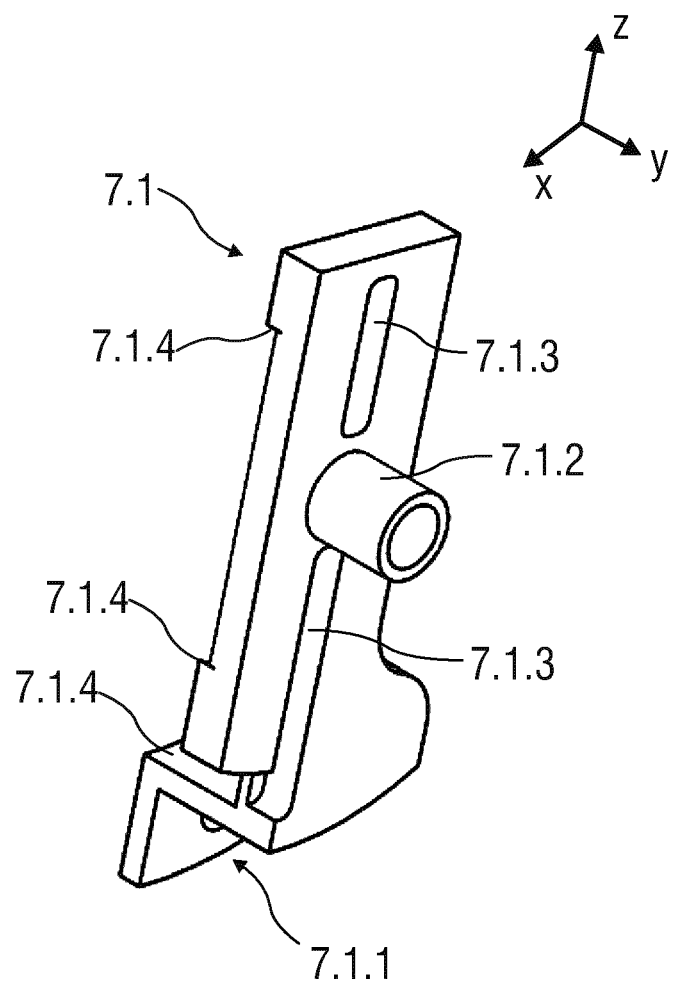
FIG. 9 is a schematic perspective view showing a component of the fitting.

FIG. 9 shows the main element 7.1, in the form of a carrier, of the transmission arrangement 7 in a perspective plan view of the other surface side. The main element 7.1 furthermore has at least one guide 7.1.3 for the translational guidance of the slide element 7.2. Here, the guide 7.1.3 is in the form of a groove, recess or depression formed into the surface of the main element 7.1. Alternatively, the guide 7.1.3 may be in the form of a channel. The guide 7.1.3 extends above and below the bearing means 7.1.2. Alternatively, the guide 7.1.3 may extend only above or only below the bearing means 7.1.2. Alternatively, the guide 7.1.3 may be slightly arcuate, in the manner of a sliding-block guide, for example may be in the form of an arcuate elongated hole.

Figure 10:
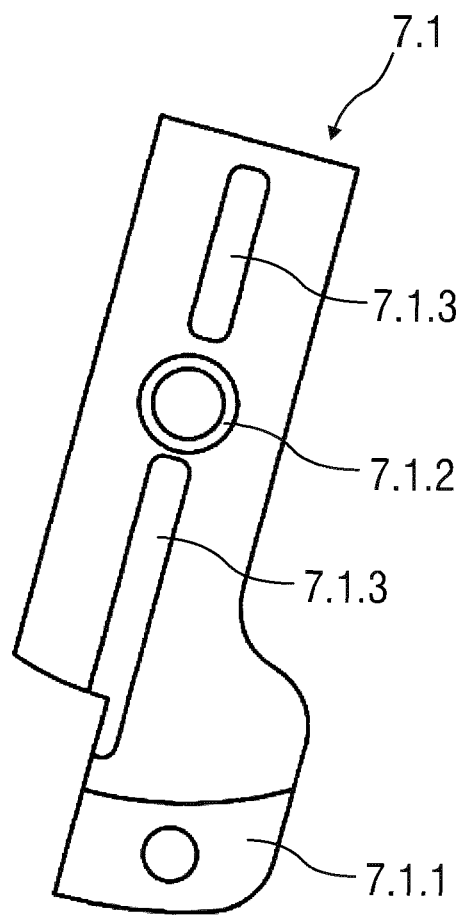
FIG. 10 is a schematic side view showing a component of the fitting.

FIG. 10 shows the main element 7 in a plan view from the inside, with the guides 7.1.3.

Figure 11:
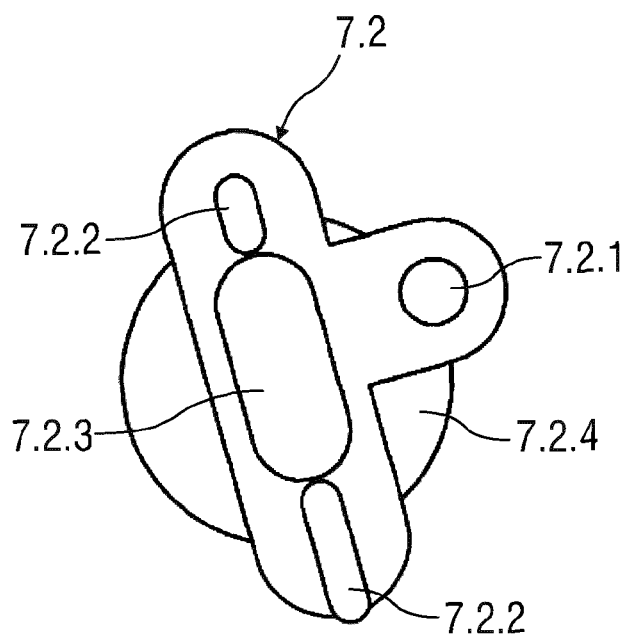
FIG. 11 is a schematic side view showing a component of the fitting.
Figure 12:
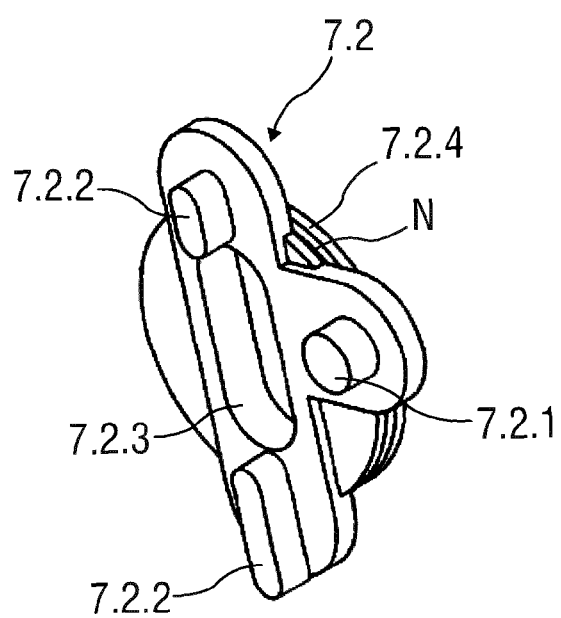
FIG. 12 is a schematic perspective view showing a component of the fitting.

FIGS. 11 and 12 show the slide element 7.2 with the guide elements 7.2.2 corresponding to the guides 7.1.3. The guide elements 7.2.2 are in the form of elongate pins or pegs. The driver 7.2.1 is in the form of a peg or pin. Centrally, the slide element 7.2 has a slide groove 7.2.3, into which the bearing means 7.1.2 of the transmission element 5 engages, such that the slide element 7.2 can be moved in translational fashion relative to the transmission element 5.

In the exemplary embodiments shown, the slide element 7.2 has peg-shaped guide elements 7.2.2, and the main element 7.1 has corresponding channel-like guides 7.1.3, which together form a channel-peg guide. Here, these may also be provided in a reversed arrangement. That is to say, the slide element 7.2 has at least one channel or slot (in a manner not illustrated in any more detail), and the main element 7.1 has at least one corresponding peg or pin.

To receive the tension element 6, in particular the end-side loop 6.1 thereof, the disk element 7.2 has a circular or ring-shaped receiving element 7.2.4 with an encircling groove N, as illustrated in FIG. 12.

Figure 13:
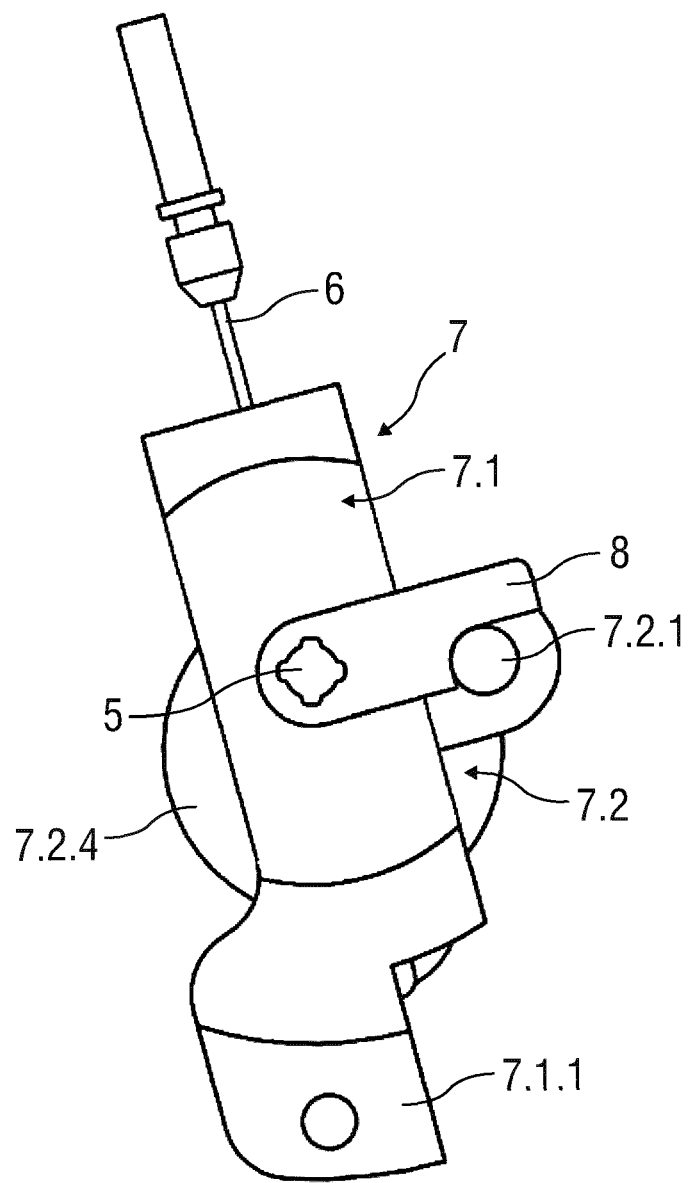
FIG. 13 is a schematic side view showing some of various components of the fitting.
Figure 14:
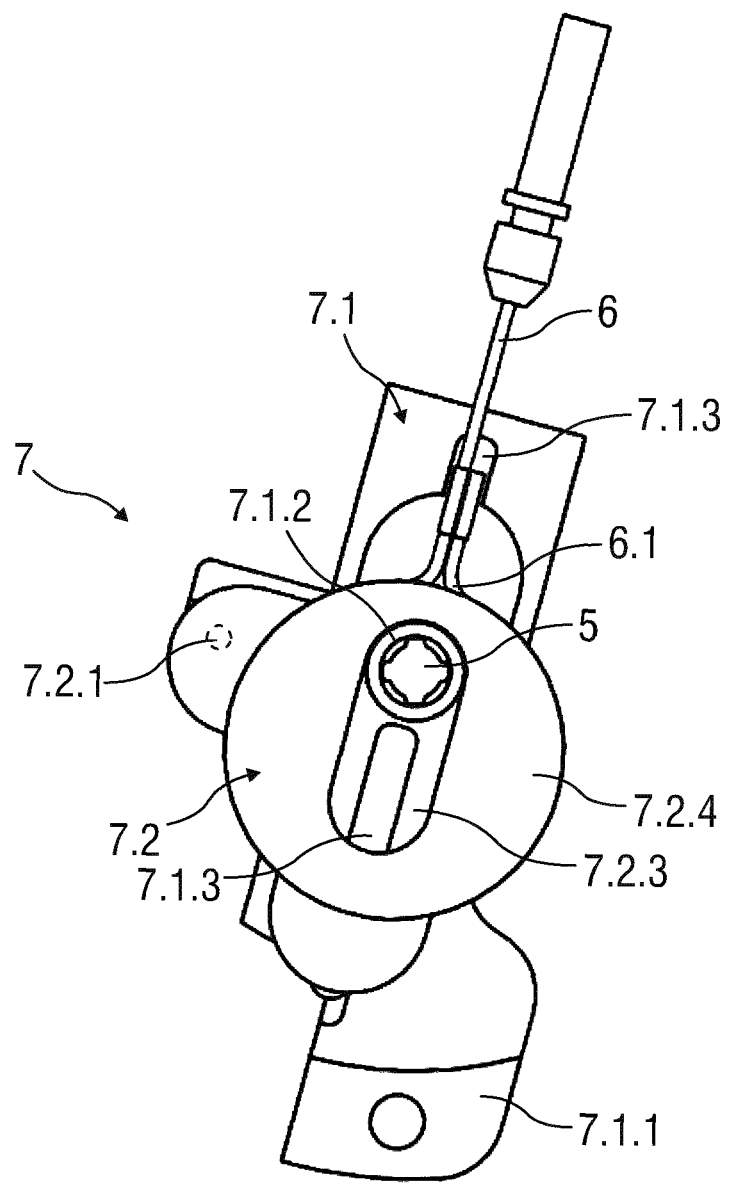
FIG. 14 is a schematic side view showing some of various components of the fitting.
Figure 15:
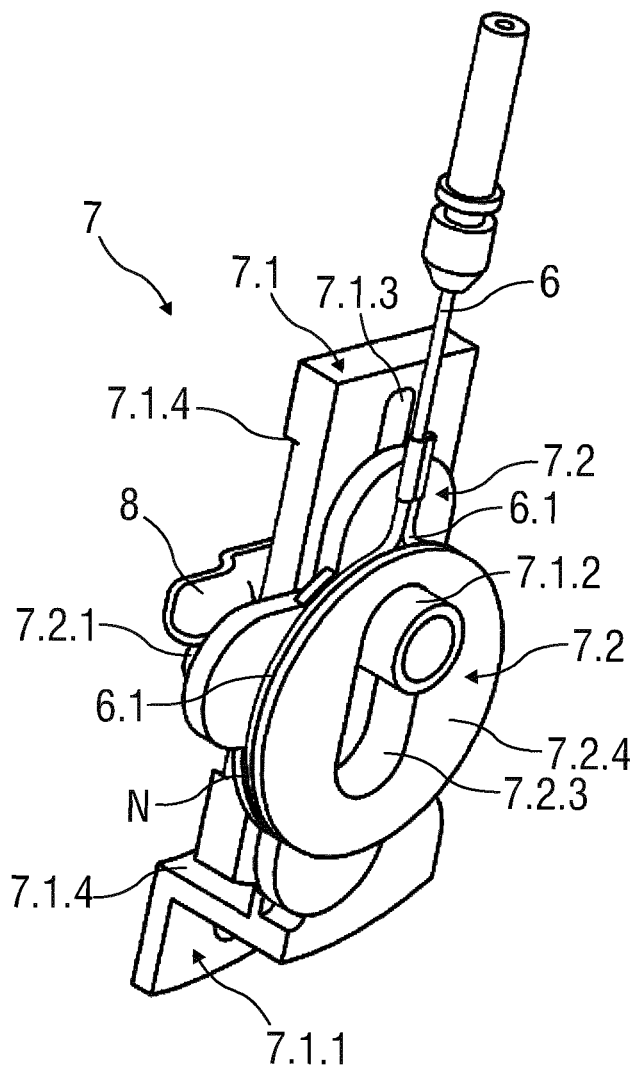
FIG. 15 is a schematic perspective view showing some of various components of the fitting.

FIGS. 13 to 15 show the transmission arrangement 7 in the assembled state, with the unlocking lever 8 of the easy-entry system EE arranged thereon, from different sides.

During the operation of the fitting 2, the tension element 6, the Bowden cable, is pulled, whereby the slide element 7.2 (also referred to as slide) is guided or pushed upward, and thus moved at least in translational fashion, within suitable guides 7.1.3, for example straight or arcuate slide tracks, on the main element 7.1, for example a main plate. The driver 7.2.1, in particular the driver pin, in this case pushes the unlocking lever 8 upward or pivots the latter such that the translational movement of the slide element 7.2 is transformed into a rotational movement of the unlocking lever 8. In this way, the transmission rod, that is to say the transmission element 5, is rotated, and thus the fitting 2 or the fittings 2 is/are opened.

In its pulled end position, the central point of the loop 6.1 of the tension element 6 (Bowden cable loop) is in this case situated approximately congruently with the backrest center of rotation and with the pivot axis S, whereby, in the event of the backrest 1.1 being pivoted or folded down, the length ratio of the tension element 6 (Bowden cable) relative to the slide element 7.2 (slide) is not changed, and the tension element 6 is not tensioned.

The system remains functional even if the backrest 1.1 has a certain comfort adjustment range.

The invention is used in particular for a vehicle seat 1 having a backrest 1.1 with at least one forward position in which the vehicle seat generally cannot be sat on and which can be set by way of the actuation lever 4, which is generally situated in the vicinity of the backrest upper edge. In this way, it is advantageously the case, if the transmission element 5 remains positionally fixed during the pivoting of the backrest, that a second unlocking handle (not illustrated—for example a comfort lever on the fitting 2), which is for example pushed directly onto one end of the transmission element 5, is not co-rotated when the backrest 1.1 is pivoted.

Figure 16:
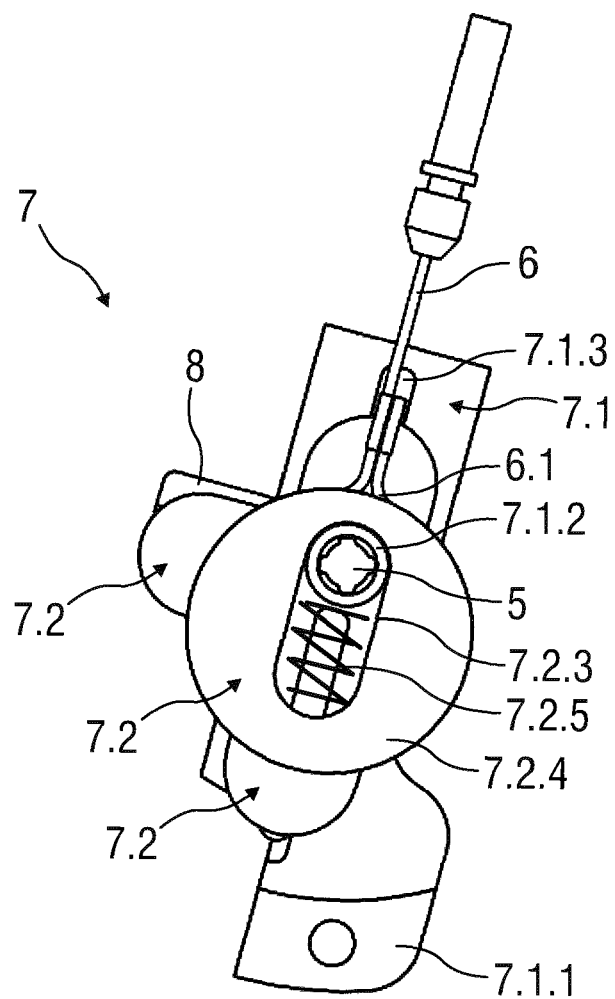
FIG. 16 is a schematic side view showing some of various components of the fitting.

FIG. 16 shows a further exemplary embodiment of the invention. The slide element 7.2 may preferably be spring-preloaded, such that the Bowden cable core of the tension element 6 is under tensile load. For this purpose, the slide element 7.2 has a spring element 7.2.5, for example in the form of a compression spring, in the slide groove 7.2.3 (also referred to as guide elongated hole).

The main plate or the main element 7.1 has, in this exemplary embodiment, a sleeve-like bearing means 7.1.2 as a guide for the transmission element 5.

The unlocking lever 8 is fastened in positively locking, non-positively locking and/or cohesive fashion to the bearing means 7.1.2. For example, the unlocking lever 8 is welded to the bearing means 7.1.2 of the transmission element 5. Other embodiments are also possible. For example, the unlocking lever 8 may be in the form of a plastics part and fastened in positively locking and/or non-positively locking fashion to, in particular pushed onto, the bearing means 7.1.2 and may form a rotational form fit with the transmission element 5. This is advantageous in particular if a freewheel is required, for example for the purposes of compensating tolerances.

The loop 6.1 on the end of the tension element 6 serves for the rotation, during the pivoting of the backrest, in the groove N of the slide element 7.2, and thus about the slide element 7.2 which is moved, in particular pulled, in translational fashion. The function of the loop 6.1 may alternatively be replaced by an auxiliary part (not illustrated in any more detail) in the form of a ring, which in turn then offers a suspension facility for the tension element 6.

While specific embodiments of the invention have been shown and described in detail to illustrate the application of the principles of the invention, it will be understood that the invention may be embodied otherwise without departing from such principles.

The invention claimed is:

1. An easy-entry system for a vehicle seat having a backrest and having a seat cushion, in an arrangement with a fitting for an inclination adjustment of the backrest relative to the seat cushion at least in a comfort range and with an enhanced comfort function for the positioning of the backrest beyond an easy-entry position or beyond a forward position into a loading floor position, the easy-entry system comprising:
   at least one actuation lever;
   an unlocking lever;
   at least one tension element, the at least one actuation element being coupled via the at least one tension element to the unlocking lever for the unlocking of the inclination adjustment of the backrest, wherein the at least one tension element is articulatedly connected in a region of a pivot axis of the backrest such that the at least one tension element is not tensioned when the backrest is folded down onto the seat cushion and the at least one tension element is tensioned when the backrest is in an unfolded position with respect to the seat cushion; and
   a slide element, wherein the slide element has at least one receiving element with an externally at least partially encircling groove in which an end-side loop of the tension element is arranged.

2. The easy-entry system as claimed in claim 1, wherein the slide element is a part of a transmission arrangement and a translational movement of the tension element is transformed by way of the transmission arrangement into a rotational movement of the unlocking lever for the opening of the fitting.

3. The easy-entry system as claimed in claim 2, wherein the transmission arrangement comprises at least one main element, which is fixed relative to a substructure, and the slide element, which is movable relative to said main element, translationally, and which comprises a driver which is connected to the unlocking lever.

4. The easy-entry system as claimed claim 3, wherein the slide element has at least one slide groove into which a bearing of the main element is arranged, wherein the bearing and the slide groove form a slot-pin guide.

5. The easy-entry system as claimed in claim 4, wherein the slide element is held on the main element by a guiding mechanism so as to be movable relative thereto.

6. The easy-entry system as claimed in claim 5, wherein the slide element has at least one guide element which engages into a guide of the main element, or vice versa, wherein the guide element and the guide form a slot-pin guide.

7. The easy-entry system as claimed in claim 3, wherein the driver is in the form of a driving pin which projects from the slide element and which engages into a recess of the unlocking lever.

8. The easy-entry system as claimed in claim 3, wherein the unlocking lever is connected to a transmission element.

9. The easy-entry system as claimed in claim 8, wherein the transmission element is mounted rotatably in a bearing of the main element.

10. A vehicle seat comprising:
    a backrest;
    a seat cushion, in an arrangement with a fitting for an inclination adjustment of the backrest relative to the seat cushion at least in a comfort range and with an enhanced comfort function for the positioning of the backrest beyond an easy-entry position or beyond a forward position into a loading floor position; and
    an easy entry system comprising:
    at least one actuation lever;
    an unlocking lever;
    at least one tension element, the at least one actuation element being coupled via the at least one tension element to the unlocking lever for the unlocking of the inclination adjustment of the backrest, wherein the at least one tension element is articulatedly connected in a region of a pivot axis of the backrest such that the at least one tension element is not tensioned when the backrest is folded down onto the seat cushion and the at least one tension element is tensioned when the backrest is in an unfolded position with respect to the seat cushion; and
    a slide element, wherein the slide element has at least one receiving element with an externally at least partially encircling groove in which an end-side loop of the tension element is arranged.

11. A vehicle seat as claimed in claim 10, wherein the slide element is a part of a transmission arrangement and a translational movement of the tension element is transformed by way of the transmission arrangement into a rotational movement of the unlocking lever for the opening of the fitting.

12. A vehicle seat as claimed in claim 11, wherein the transmission arrangement comprises at least one main element, which is fixed relative to a substructure, and the slide element, which is movable relative to said main element, translationally, and which comprises a driver which is connected to the unlocking lever.

13. A vehicle seat as claimed claim 12, wherein the slide element has at least one slide groove into which a bearing of the main element is arranged, wherein the bearing and the slide groove form a slot-pin guide.

14. A vehicle seat as claimed in claim 13, wherein the slide element is held on the main element by a guiding mechanism so as to be movable relative thereto.

15. A vehicle seat as claimed in claim 14, wherein the slide element has at least one guide element which engages into a guide of the main element, or vice versa, wherein the guide element and the guide form a slot-pin guide.

16. A vehicle seat as claimed in claim 12, wherein the driver is in the form of a driving pin which projects from the slide element and which engages into a recess of the unlocking lever.

17. A vehicle seat as claimed in claim 12, wherein the unlocking lever is connected to a transmission element.

18. A vehicle seat as claimed in claim 17, wherein the transmission element is mounted rotatably in a bearing of the main element.

19. A vehicle seat as claimed in claim 18, wherein the unlocking lever and the transmission element are connected with each other by a form-fit connection or force-fit connection.

20. The easy-entry system as claimed in claim 8, wherein the unlocking lever and the transmission element are connected with each other by a form-fit connection or force-fit connection.

\* \* \* \* \*